United States Patent [19]
Wear

[11] 3,846,375
[45] Nov. 5, 1974

[54] AROMATIC POLYETHER OXETANE RESINS

[75] Inventor: Robert L. Wear, West Saint, Minn.

[73] Assignee: Minnesota Mining and Manufacturing Company, St. Paul, Minn.

[22] Filed: Sept. 17, 1973

[21] Appl. No.: 397,800

Related U.S. Application Data

[63] Continuation of Ser. No. 210,193, Dec. 20, 1971, abandoned.

[52] U.S. Cl..................... 260/61, 260/47 R, 260/49
[51] Int. Cl............................................. C08g 23/04
[58] Field of Search........................... 260/61, 47 R Primary Examiner—Melvin Goldstein
Attorney, Agent, or Firm—Alexander, Sell, Steldt & DeLaHunt

[57] ABSTRACT

The disclosed polymers are prepared from the interaction of a difunctional alkali metal phenate and a dihalide. At least some of the dihalide should be an aliphatic compound containing an oxetane (oxacyclobutane) ring attached to a carbon of the aliphatic chain. Up to 90 mole percent of the dihalide can, however, be an aromatic dihalide containing an electron-withdrawing group substituted on the aromatic nucleus, e.g., a sulfone group. The resulting oxetane-containing polymers can be crosslinked by reactions similar to those used to crosslink epoxy resins.

14 Claims, No Drawings

AROMATIC POLYETHER OXETANE RESINS

This is a continuation, of application Ser. No. 210,193 filed Dec. 20, 1971, now abandoned.

This invention relates to polymers containing a plurality of oxacyclobutane (oxetane) groups. An aspect of this invention relates to aromatic polyethers which have been copolymerized with an aliphatic monomer containing an oxetane (oxacyclobutane) group. A further aspect of this invention relates to oxetane-containing poly(arylethers) made by nucleophilic aromatic substitution wherein a difunctional alkali metal phenate is copolymerized with a reactive aromatic dihalide and an aliphatic dihalide containing an oxetane group. A still further aspect of this invention relates to the copolymerization of an alkali metal salt of a polynuclear bisphenol of the bisphenol A type with a polynuclear aromatic dihalide in which the halo-position on the aromatic ring has been activated for a nucleophilic substitution by the further substitution on the rings with an electron-withdrawing group (e.g., a sulfone), the two aromatic monomers being copolymerized with a bis-halo-alkylene oxetane such as bischloromethyl oxetane (BCMO). A still further aspect of this invention relates to the cross-linking of polymers made according to this invention, the crosslinking reactions being analogous to those used in the crosslinking of epoxy resins.

DESCRIPTION OF THE PRIOR ART

It is known that polymers can be made containing monomeric units of the formula (Formula I)
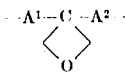

where $A^1$ and $A^2$ are lower alkylene (preferably methylene or ethylene) radicals. The oxacyclobutane ring which is linked into the aliphatic chain through the quaternary carbon atom is commonly called an oxetane ring, and polymers containing units of the above formula can be referred to as oxetane polymers. A discussion of the general chemistry of oxetanes can be found in *Heterocyclic Compounds With Three- and Four-Membered Rings*, Arnold Weissberger, Editor, Part Two, Chapter IX, p. 983 (Interscience Publishers, 1964).

It is also known that the oxetane (oxacyclobutane) ring behaves somewhat like an epoxy (oxirane) ring in that catalysts and/or co-curatives (sometimes referred to as crosslinking agents) can be used to open the ring and link two or more chains together to form a crosslinked polymer. For example, polycarboxylic acid anhydrides and other polyfunctional compounds such as polyamines, polycarboxylic acids, polymercaptans, polyacid halides, or the like are capable of linking two or more oxetane sites just as epoxy sites are linked by epoxide cocuratives. The result is an increased amount of three-dimensional structure in the crosslinked or "cured" polymer and hence an increased amount of rigidity of the polymer structure. The more highly rigid polymer structures are generally referred to as thermoset polymers, because plasticity or fluidity of the structure cannot be imparted through heating. Further characteristics of thermoset polymers are increased solvent resistance, increased thermal stability, and the lack of a true melting point or melting range. These characteristics can be advantageous or disadvantageous, depending upon the ultimate use of the polymer.

The epoxy (epoxide) monomers and prepolymers commonly used in making thermoset epoxy materials are considered basic chemicals of broad commercial utility. These uncrosslinked or "uncured" chemicals have some disadvantages, however. In the uncured state, they have very little mechanical strength and can have a limited shelf life when admixed with catalysts and/or crosslinking agents. Indeed, some of the most commonly used epoxide "prepolymers" are liquids or soft solids soluble in a variety of organic liquids. After crosslinking or curing, these chemicals become hard, rigid, solvent-resistant solids, but may also be too brittle for many applications, e.g., those applications which require a flexible film of material. A further problem is that the crosslinking or curing reaction tends to evolve large amounts of heat, in some instances enough heat to cause charring of the cured polymer mass.

Various aromatic dihalides and salts of various difunctional phenolic compounds have been copolymerized to form aromatic polyethers and the like with good electrical properties and outstanding thermal stability. See *Journal of Polymer Science*, 5, Part A–1, page 2375 (1967) and U.S. Pat. No. 3,264,536 (Robinson et al.) issued Aug. 2, 1966. These linear polymers have low solvent resistance due to their linearity, and no simple and convenient heat-activated means for crosslinking them has been devised.

SUMMARY OF THE INVENTION

In the present invention, it has been discovered that an aliphatic dihalide containing an oxetane ring, e.g., bischloromethyloxetane, can be substituted in whole or in part for the aromatic dihalides used in the nucleophilic aromatic substitution polymerization reaction described in, among other places, Johnson et al., *Journal of Polymer Science*, Vol. 5, Part A–1, pages 2,375–2398 (1967). That is, according to this invention, polymers are formed by the copolymerization of the following monomers:

(Formula II)
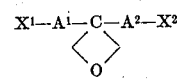

$$MO - Ar^1 - OM$$

(Formula III)
and preferably also $$X^3 - Ar^2 - X^4$$

(Formula IV)
wherein $A^1$ and $A^2$ are lower aliphatic (preferably lower alkylene) radicals; M is an alkali metal; $Ar^1$ and $Ar^2$ are aromatic nuclei, preferably polycyclic aromatic nuclei containing separate rings; and $X^1$, $X^2$, $X^3$, and $X^4$ are the same or different and are substituents such as halogen atoms which can be split out to form the salt MX.

The copolymerization reaction is stoichiometric; hence, substantially equimolar amounts of M and X should be present in the starting materials. That is, a mole of dihalide or the like is used for each mole of bisphenol alkali metal salt, the mole of dihalide being at least 0.1 mole oxetane-containing monomer + no more than 0.9 mole aromatic dihalide, or any relatively increased amount of oxetane monomer up to 100 percent of the dihalide component of the reaction mixture. Stated another way, this dihalide component is 10 – 100 mole percent (preferably 15 – 40 mole percent) oxetane monomer, and 90 – 0 mole percent (preferably 80 – 60 mole percent) aromatic dihalide. By means of this use of 10 – 100 mole percent oxetane monomer, the equivalent weight of resulting polymer per oxetane group (assuming primarily bi-cyclic aromatic nuclei) can range from about 300 to about 4,300. This range of oxetane content provides a range of properties; the solvent resistance or solubility, the crystalline or amorphous character, and the ease or difficulty of stress orientation of films made from the polymer are among the properties affected. It should also be noted that the crosslink density of polymers of this invention after curing is dependent upon the oxetane content.

Uncured (uncrosslinked) polymers of this invention are useful materials in themselves. They can be formed into strong, flexible films, and those polymers with very high oxetane content (e.g., more than 50 mole percent oxetane monomer per mole of dihalide materials) can exhibit behavior similar to that of poly(ethyleneterephthalate). The preferred uncured polymers having good film-forming properties are high molecular weight solids which exhibit an inherent viscosity (as defined subsequently) in the range of 0.4 to 1.5, more preferably at least 0.5. Films made from the uncured oxetane polymers can contain catalysts and/or crosslinking agents, so that the mere application of heat will convert the film into a thermoset material with high solvent resistance.

Thus, the oxetane polymers of this invention are also intermediates for the production of crosslinked materials. These crosslinked materials have a surprising amount of both flexiblity and strength. By analogy to epoxide chemistry, it might be expected that the crosslinked materials would be excessively rigid, but this disadvantage can be avoided by following the teachings of the present invention. Some epoxy handling problems, particularly excess heat evolution during cure and short shelf life are much less bothersome with oxetane materials due to their lower reactivity with curatives or crosslinking agents. Suitable crosslinking agents include polycarboxylic acid anhydrides and other polyfunctional compounds such as polyamines, polycarboxylic acids, polymercaptans, polyacid halides, and the like. Crosslinked polymers and polymer films made according to this invention, in addition to increased solvent resistance, have outstanding thermal stability and can be used as coatings on metal, printed circuit backings, food packages which must be subject to high temperatures, and the like.

DETAILED DESCRIPTION AND EXAMPLES

A particularly useful and convenient index of the molecular weight of the uncured oxetane polymers of this invention is obtained through "inherent viscosity" calculations derived from relative viscosities measured with a U-tube viscometer (e.g., a Series 100 Cannon Fenske Viscometer).

A relative viscosity is determined by measuring the time taken for a solution consisting of the polymer, dissolved in a specified solvent, to flow past a delineated segment of the U-tube and dividing this measurement by the time taken for an identical volume of the pure solvent. The inherent viscosity of the solution is then calculated by the following equation:

$$\text{Inherent Viscosity} = \frac{\text{natural log of relative viscosity}}{\text{wt. in grams in 100 ml. of sol'n.}}$$

The procedure for obtaining relative viscosity data used in this invention was as follows. First, a sample of the solvent, i.e., 1,1,2,2-tetrachloroethane was placed in the clean, dry viscometer which had been held at 30° C. The solvent was retained in the viscometer for 10 minutes to attain temperature equilibrium at 30° C. with the device. The measurement of flow rate was then taken. Next the process was repeated with a solution containing 0.25 gm. of polymer/50 ml. of solvent and the relative viscosity was calculated as indicated above. This procedure was repeated five times and the average of these relative viscosity measurements was used to calculate inherent viscosity according to the formula shown above.

The above-described "inherent viscosity" calculations are often used as a molecular weight determination method in the art of making and using film-forming polymers. For example, considerable data on the inherent viscosities of poly(ethyleneterephthalate) solutions are available for several different molecular weights of that particular polymer.

Throughout the specification, the term "polymer" is used in a generic sense and is intended to encompass copolymers, terpolymers, and other multi-unit polymers.

As pointed out previously, the polymers of this invention are prepared from an oxetane-containing compound and a difunctional alkali metal phenate, and preferably also a suitable aromatic dihalide. The resulting oxetane-containing polymer can be crosslinked with known crosslinking or curing agents. Catalysts are also useful in obtaining a crosslinked polymer. A detailed description of these starting materials, crosslinking or curing agents, and catalysts follows:

ALKALI METAL SALTS OF DIHYDRIC PHENOLS

As is well known in the art, alkali metal salts of the formula $$MO—Ar^1—OM,$$

(Formula V)
where M is the alkali metal (e.g., sodium or potassium) and $Ar^1$ is an aromatic nucleus, can be prepared from the corresponding dihydric phenolic compound $HO—Ar^1—OH$, where $Ar^1$ is as defined previously. Carbocyclic $Ar^1$ radicals are preferred, but it is known to make use of heterocyclic aromatic nuclei in polymers of aromatic polyether type. The dihydric phenol-type compounds, generally useful in providing the diphenate salts used in this invention, are described in detail in U.S. Pat. No. 3,264,536 (Robinson et al.), issued Aug. 2, 1966 and in *J. Polym. Sci.*, 5, Part A–1, page 2375 (1967). As taught in the Robinson et al. patent, monocyclic dihydric phenols (e.g., hydroquinone) can provide useful polyphenate salts, but the preferred dihydric phenols, hence the preferred aromatic nuclei, are polycyclic. A suitable polycyclic nucleus comprises two independent aromatic groups, preferably monocyclic and preferably joined by symmetrical or assymmetrical divalent bridging radical, e.g., an alkylene group (typically —CR$_2$— where R is H or lower alkyl) or other hydrocarbon residue, oxygen ( — O — ), carbonyl ( — CO — ), sulfide ( — S — ), sulfone ( — SO$_2$ — ), etc., the hydrocarbon and sulfone bridges being preferred. Other suitable polycyclic aromatic nuclei can be based on the biphenyl structure Ph-Ph, where Ph is phenyl. When the hydrocarbon "bridge" is alkylene (i.e., disubstituted alkane), the 2,2-substituted propane bridge (e.g., —C[CH$_3$]$_2$—) is a particularly practical example of a suitable bridge, since the bisphenol A-type compounds are readily available. Other suitable bridging radicals include divalent radicals derived from cyclohexane, 2-(4-methylcyclohexyl)propane, ethyl cyclohexane, norbornane, methane, diphenyl methane, diperfluoromethylmethane, and mono-i-propylmethane.

In the bisphenol A and other aromatic nuclei in compounds of the aforementioned formula MO — Ar — OM, each unsubstituted phenylene can be substituted with up to four substituents.

Substituents on the phenyl or other aromatic radicals are selected so as to not interfere with the reaction of the diphenate salt with oxetane-containig compound. Typical non-interfering substituents include alkyl (preferably C$_1$ to C$_4$ lower alkyl) radicals and halogens such as bromine, or, less preferably, C$_1$ to C$_4$ alkoxy radicals. Thus, among the preferred diphenate alkali metal salts are the alkali metal salts of bisphenol A, tetramethyl bisphenol A, and tetrabromo bisphenol A, or a compound of the formula

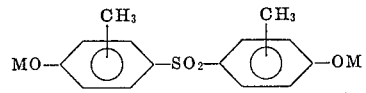

where M is the alkali metal. Several other suitable diphenate salts are taught by the Robinson et al. patent, most of which have the formula MO — Ph — B — Ph — OM, where M is the alkali metal, Ph is phenyl (including substituted phenyl) and B is one of the aforementioned bridging radicals.

OXETANE COMPOUND

The oxetane-containing compounds used to react with the diphenate alkali metal salts are preferably monomers alpha substituted with an anion-forming radical, so that two moles of the salt MX (where M is an alkali metal and X is the anion) can be split out when the diphenate salt/oxetane monomer reaction takes place. The oxetane monomer can be illustrated by the following structural formula:

(Formula VI)
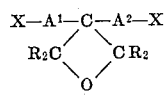

where
A$^1$ and A$^2$ are lower aliphatic radicals, preferably CR$_2$ or methylene;
X is a halogen such as chlorine; and R is hydrogen or, less preferably, C$_1$ – C$_4$ alkyl.
The R's are selected to avoid steric hindrance, and the X's are preferably substituted alpha to the quarternary carbon linked to A$^1$ and A$^2$.

An example of a commercially available monomer of Formula VI is the compound wherein X is chlorine and the aliphatic radicals are methylene, i.e., bischloromethyloxetane, hereinafter referred to for convenience as BCMO.

AROMATIC DIHALIDES

The aromatic dihalides used in this invention are compounds having two activated halogens, each activated halogen being directly bonded to an aromatic ring. A halogen is considered activated if it will react with the alkali metal phenate salt to split out the corresponding alkali metal halide. The conventional means for activating a ring-substituted halogen is to provide an electron-withdrawing substituent in at least one of the positions ortho or para to the halogen. Both halogens can be substituted on the same aromatic ring or preferably, on independent rings joined by a covalent bond or a bridging radical. It is preferred that the bridging radical be the electron-withdrawing group. The aromatic rings or nuclei are preferably carbocyclic (e.g., phenyl, including substituted phenyl), but, as is known in the art, hetero rings (e.g., a diazine such as 1,2-diazine) are useful in poly(aryl ether)-type polymers. One particularly useful type of aromatic dihalide has the general formula (Formula VII) 

where X is halogen (e.g., Cl or F, Br and I being more difficult to activate) and — B — is the divalent, electron-withdrawing (i.e., activating) bridging radical, e.g., carbonyl or sulfone. Other known divalent bridging radicals with this property include azo, sulfoxide, vinyl, perfluoroalkylene, and other radicals having either a positive sigma$^+$ value or an inductive effect favoring electron withdrawal. For a discussion of the sigma$^+$value, see column 4 of the aforementioned U.S. Pat. No. 3,264,536. Various other electron-withdrawing bridging radicals have also been used in the art, including: organic phosphine oxides, ethylidene groups, and groups having one of the following structures:

(Formula VIII) 

(Formula IX) 

The aromatic nuclei in the dihalide can be further substituted with additional substituents having the previously described electron-withdrawing property. For example, additional halogen substituents are permissible. Electron-donating substituents are not preferred. Suitable monovalent electron-withdrawing substituents include nitro, phenylsulfone, alkylsulfone, cyano, trifluoromethyl, and nitroso radicals, as well as heteronitrogens (e.g., pyridino). When the aromatic dihalide is monocyclic and both halogens are substituted on the same ring, one or more of these monovalent electron-withdrawing groups can be substituted at least ortho or para to the halogens to activate them, as in 1-nitro, 2,4-dichlorobenzene.

CURATIVES, CROSSLINKERS AND CATALYSTS

The oxetane rings of this invention can be opened and thereby made reactive through strong heating in the presence of a strong acid or Lewis acid catalyst or other oxetane-opening catalysts, a particularly suitable catalyst being tin (IV) chloride. The ring-opening reaction facilitates further reactions which can cure the polymers of this invention, the cure being evidenced by a significant increase in solvent resistance, e.g., only slight swelling when immersed in chlorobenzene.

One preferred method for curing the oxetane-containing polymers of this invention involves the use of polyfunctional co-curatives or crosslinking agents similar to those used in curing epoxides.

The preferred polyfunctional crosslinking agents are strongly acidic polycarboxylic acids, polycarboxylic acid anhydrides, and polycarboxylic acid chlorides. Polyamines are marginally operative, but not preferred. The end point of the cure can conveniently be determined by immersing a thin film of cured material in a solvent such as chlorobenzene. The end point of curing is indicated by a very small swell factor, e.g., less than 2. Several curing or crosslinking agents are capable of bringing the uncured polymer rapidly to the end point. Among these are: 2,5-dichloroterephthalic acid and other acids wherein the acid hydrogen has been activated by an inductive or resonance effect (less acidic acids such as sebacic acid are not preferred), trimellitic anhydride, pyromellitic dianhydride, benzophenone-tetracarboxylic dianhydride, and trimesoyl chloride.

As in epoxide chemistry, oxetane-containing chains can be joined by a bridge derived from the crosslinker, as follows:

(Formula X) 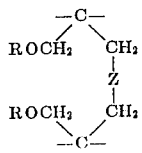

where
Z is the residue of the crosslinking agent, and
R is hydrogen or an acyl radical derived from one of the aforementioned polycarboxy-based curing agents.

For example, if the crosslinker is a dicarboxylic acid, Z would be — O — CO — R' — CO — O —, where R' is a divalent organic radical such as an arylene radical.

The crosslinking reaction can take as long as 2 or 3 hours and often requires temperatures on the order of 180° – 260° C. However, reaction times can be shortened to one-half hour and temperatures of 200° C. or less can be used when the selection of curing or crosslinking agent is optimized. One of the aforementioned catalysts, e.g., tin (IV) chloride can be used to further shorten the reaction time and lower the reaction temperature. Thus, the combination of tin (IV) chloride and trimellitic anhydride can provide a complete cure in about 20 minutes at about 180° C.

The reaction conditions for forming polymers from alkali metal salts of dihydric phenols and dihalides selected according to the teachings of this invention do not differ materially from those of the well-known nucleophilic aromatic substitution reactions described in the *J. Polym. Sci.* article referred to previously. As in the prior art, the dihydric phenol is dissolved in a suitable polar solvent (e.g., dimethyl sulfoxide) and reacted with an alkali metal hydroxide such as KOH or NaOH. The substantially stoichiometric amount of water resulting from the formation of the diphenate salt is then removed, and the phenate salt is ready for interaction with a dihalide. The phenate salt/dihalide reaction generally requires about 1 to 4 hours for completion at a reaction temperature generally within the range of 130° to 160° C. The dimethyl sulfoxide or other polar solvent initially used continues to be the reaction medium for the formation of the polymer in the phenate salt/dihalide reaction.

Dipolar aprotic solvents other than dimethyl sulfoxide have been reported to be useful in the literature. Among these are sulfolane, di-n-propyl sulfoxide, diphenylsulfone, benzophenone, and the like. The di-lower alkyl sulfoxides are preferred for the practice of this invention.

The dihalide reactant used in the process of the present invention comprises about 10 to 100 mole percent of a suitable oxetane monomer such as BCMO. The presence of the BCMO in the dihalide component of the reaction mixture does not appear to present any serious difficulty in adapting the teaching of the prior art nucleophilic aromatic substitutions to the present invention, with one exception: surprisingly, it appears that the order of addition of the dihalide reactants can be critical to the production of high molecular weight uncured polymers, i.e., polymers which exhibit an inherent viscosity in the desired range, most preferably above 0.5. When the BCMO is added to the diphenate salt before any of the aromatic dihalide is added, polymers with high inherent viscosities are obtained. Thus, it is preferred to add the bulk of the BCMO reactant prior to an aromatic dihalide, although the polymerization reaction may be further advanced with a small subsequent addition of BCMO at or near the end of the reaction. If the aromatic dihalide is reacted prior to the BCMO, the inherent viscosity may be as low as the 0.3 – 0.4 range. Films formed from these relatively lower molecular weight polymers tend to be brittle and hard to handle and thus only marginally useful in the polymeric film art. The principal utilities for these low inherent viscosity polymers are in the arts of coating metals and saturating webs. However, it should be noted that films formed from these low inherent viscosity polymers can be considerably strengthened by one of the crosslinking or curing reactions described previously.

The aromatic dihalide should be as pure as is practical; recrystallization from methyl ethyl ketone — ethanol mixtures, or from ethyl acetate, can be used to purify typical dihalides such as dichlorodiphenylsulfone.

Polymer grade bisphenols are generally adequate for the process of this invention. Alkali metal hydroxide solutions greater than 1.0 normal are preferred, e.g., 10 – 12 N. Stoichiometric quantities of the reactants are preferred, since non-stoichiometric quantities may result in a lower molecular weight of the resulting polymer.

Polymers made according to this invention, prior to curing, can be dissolved in solvents and solvent cast to form useful films. Examples of suitable solvents for solvent casting include chlorobenzene, tetrahydrofuran, s-tetrachloroethane, and mixtures of these solvents with each other and with other polar solvents such as dimethyl formamide. Films cast from the uncured polymers are useful in themselves, since they have mechanical, electrical, and chemical properties (e.g., solubility characteristics), somewhat similar to the poly(aryl ethers). As pointed out previously, the solvent-resistance properties of these films are markedly improved by a crosslinking reaction. Films can be cast containing the crosslinking agent and/or a catalyst such as tin (IV) chloride. These solid uncured films will retain their substantially linear character at room temperature and moderately elevated temperatures. However, at temperatures above 150° C., e.g., 180° – 260° C., curing begins, and the substantially linear material is converted to a crosslinked or thermoset material which is not visibly affected by soaking in chlorobenzene and has good electrical and thermal properties. The films are flexible both before and after curing. The cured films can be used as food packaging material for foods cooked in a toaster; further utility is indicated by their resistance to melting when contacted with a hot soldering iron. The cured films do weaken to some extent at temperatures above 200° C. At normal ambient temperatures, they exhibit adequate tensile strength (on the order of $10^4$ psi or about $10^3$ Kg/cm$^2$), and elongations are generally in the range of about 5 to about 10 percent. The cured polymers adhere strongly to surfaces and can be used as coatings on substrates such as metal foils, paper, glass, and the like. The coated metal foils can be used in capacitors and the like.

The principle and practice of this invention is illustrated in the following non-limiting Examples.

EXAMPLE 1

Polymer of Bisphenol A and 80:20 Dichlorodiphenyl Sulfone:BCMO

In this and the following examples, the common name Bisphenol A is used to denote 2,2-bis(4-hydroxyphenyl)propane. The preparation of the polymer involved four basic steps, as follows:

1. Preparation of di-potassium salt of Bisphenol A

Bisphenyl A (22.8 g., 0.10 moles), 75 ml. of dimethylsulfoxide and 50 ml. of toluene were placed in a 500 ml. flask equipped with a stirrer, thermometer, nitrogen inlet, Barrett trap and condenser. The trap was filled with toluene. The flask was flushed with nitrogen during the entire run. After the bisphenol A had dissolved, 27.13 g. (0.20 mole) of a 10.4 N potassium hydroxide solution was added, and mixed in with three small portions of water. The mixture was then stirred and reflexed, removing the water azeotropically. Within 2½ hours the temperature of the reaction mixture had reached 165° C. and 27.5 ml. of water has been distilled off. A solid was observed to form in the reaction mixture, which solid subsequently dissolved.

2. Addition of BCMO

The Barrett trap was removed and the heating mantle dropped. Bischloromethyl oxetane (BCMO) in the amount of 3.10 g., or 0.020 mole, was added at a rate that kept the temperature below 165° C.

3. Addition of Aromatic Dichloride

Recrystallized paradichlorodiphenyl sulfone (22.98 g., 0.080 mole) was added in portions to the dipotassium salt/BCMO reaction mixture. The addition of the dichlorodiphenyl sulfone (hereinafter referred to as CPS) caused the formation of a deep red color. The added materials were rinsed in with about 30 ml. of dimethylsulfoxide. The additions required about five minutes. Heating was resumed, and the mixture was held as closely as possible to 160° C. for 1.5 hrs. During this time the color lightened considerably, and the mixture became more viscous.

4. Completion of Polymerization and Isolation of Polymer

A subsequent addition of 10 drops of BCMO was added to the reaction mixture. After the reaction temperature had dropped to 100° C., 150 ml. of chlorobenzene was added. The cooled, diluted reaction mixture was filtered, and the filtrate added to approximately five volumes of methanol in a mixer (a Waring Blender). The precipitated polymer was collected and washed with methanol. (It was also found that the polymer could conveniently be precipitated by diluting the reaction mixture with dioxane and adding water.) The oven dried polymer, a white amorphous solid, had an inherent viscosity of 0.67. The inherent viscosity determination was carried out with a 0.5 wt. percent solution in s-tetrachloroethane, as described previously.

A film was formed from the polymer isolated in step (4) by pressing at 220° – 230° C. A 15 weight percent solution of polymer in chlorobenzene was used for casting film on a polyethyleneterephthalate carrier web. Heat-formed and oven dried films were transparent and flexible.

In a second run of the above-described preparation, a 5-liter flask was used and the amounts of the reactants were scaled up by a factor of 20. In this second run, the water removal required about 12 hours, and the polymerization time was 2 – 3 hours.

EXAMPLE 2

Polymer of Bisphenol A and BCMO

The procedure of Example 1 was followed except that no dichlorodiphenylsulfone was added. The resulting substantially linear polymer contained repeating units of the formula

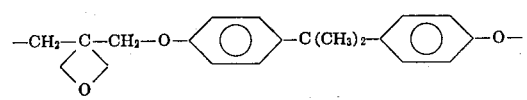

The polymer was a white, semi-crystalline solid somewhat similar to poly(ethyleneterephthalate) in properties. Its melting point was 263° C. and its glass transition temperature was 118° – 128° C. A pressed film made from the polymer was biaxially oriented 2 × 2 at 270° F. (132.2° C.) and was found to have a tensile strength of 26,000 psi (1,820 Kg/cm$^2$) and an elongation of 90 percent.

EXAMPLE 3

In this Example, the procedure of Example 1 was followed, except that the ratio of dichlorodiphenyl sulfone (hereinafter CPS) to BCMO was varied over the range of 90:10 to 40:60. That is, in the dihalide component, the mole percent of BCMO was varied from 10 to 60 and the mole percent of CPS was varied from 90 to 40. The following table indicates the oxetane and BCMO content which can be obtained by varying the ratios within these limits:

| Moles CPS:Moles BCMO | Equivalent Wt. of Polymer per Oxetane Group | Wt. % of BCMO Used of Final Polymer |
|---|---|---|
| 90:10 | 4290 | 3.6% |
| 80:20 | 2080 | 7.5% |
| 75:25 | 1640 | 9.5% |
| 67:33 | 1190 | 13 % |
| 60:40 | 975 | 15.9% |
| 40:60 | 605 | 25.6% |

At the higher CPS:BCMO ratios, the polymer resembles the 100 percent CPS polymer of the prior art. It is amorphous and soluble in a variety of solvents, but, unlike the prior art polymers, can be crosslinked, as will be shown subsequently. As the quantity of BCMO is increased, the polymer solubility decreases, and the polymer becomes more like the crystalline 100 mole percent BCMO polymer of Example 2. Thus, heating was necessary to keep the 40:60 CPS:BCMO polymer in chlorobenzene solution, but all the polymers (even the 40:60) could be solvent cast to form films.

When the order of addition of the reactants was as in Example 1, inherent viscosities in excess of 0.5 and even as high as 0.98 could be obtained for these polymers. However, it was found that careful removal of water, use of stoichiometric quantities, and purification of the CPS as well as proper order of addition was necessary to provide these high inherent viscosity values. For the 80:20 polymer, for example, improper addition of reactants and the use of chlorobenzene instead of toluene as the cosolvent for bisphenol A, though operative, provided an inherent viscosity of only 0.23. Optimized runs provided inherent viscosities of 0.56 for the 90:10 polymer; 0.98 for the 80:20 polymer; 0.81 for the 75:25 polymer; 0.77 for the 70:30 polymer; 0.70 for the 67:33 polymer; 0.74 for the 60:40 polymer; and 0.85 for the 40:60 polymer.

EXAMPLE 4

In accordance with the teachings of the preceding Example, a polymer was prepared from bisphenol A and a dichloride component containing 80 mole percent BCMO and 20 mole percent CPS. As in Example 1, 0.1 mole of the bisphenol was dissolved in dimethylsulfoxide (150 ml.) and toluene (100 ml.). The required amount of potassium hydroxide (0.2 mole) was added; the concentration of KOH was 11.34 N. Water and toluene were distilled off, and the BCMO was added when the reaction temperature had reached 166° C. The CPS was then added, resulting in a hazy red-brown solution. After the reaction had progressed for 2.5 hours, 10 drops of BCMO were added slowly as in Example 1. A stringy solid mass resulted which was worked up, ground in a blender with water, filtered and washed repeatedly with distilled water and alcohol, and oven dried at 250° F. (121° C.) for 3 hours. The purified polymer dissolved in hot chlorobenzene, but precipitated upon cooling of the solution. A satisfactory film could not be cast from solution, indicating the likelihood of some crystallinity or semi-crystallinity, but a tough, drawable film was pressed at 225° – 250° C. The inherent viscosity, determined by the previously described procedure, was found to be 1.1.

EXAMPLE 5

A polymer was made according to Example 3 except that isopropylidene dixylenol and tetrabromo bisphenol A were substituted for the bisphenol A used in preceding examples. The amount of bisphenol compound in each instance was 0.2 mole; the amount of CPS was 0.16 mole; and the amount of BCMO was 0.04 mole. Inherent viscosities in the range of 0.4 to 0.5 were obtained, and film-forming properties were satisfactory.

EXAMPLE 6 (Curing)

A polymer prepared according to Examples 1 and 3 (80:20 CPS:BCMO) was prepared and found to have an inherent viscosity of 0.56. The polymer (8.4 g.) was dissolved in 28 ml. of tetrahydrofuran. To this viscous solution, 0.76 g. (4 millimoles) of trimellitic anhydride was added and readily dissolved. It was found that the resulting casting solution could provide a cleaner film if excess solvent was added and the mixture filtered through diatomaceous earth. The filtrate was first concentrated and then degassed by placing in a vacuum desiccator for several minutes, the pressure being regulated to prevent boiling of the tetrahydrofuran. The solution was knife-coated on a 5-mil (0.127 mm) polyester backing at 5 – 10 mils (0.13 – 0.25 mm) wet thickness. After air-drying for 16 hours, the film was removed from the backing, clamped in a metal frame, and placed in an oven. The oven temperature was slowly increased to 210° C. and held at this temperature for 3 hours. The clear transparent film was strong and flexible, resistant to chlorobenzene, and resistant to melting upon contact with a hot soldering iron. (This indicated a complete cure in the oven.)

Similar results were obtained when casting films from a solvent mixture consisting of chlorobenzene, dimethylformamide, and tetrahydrofuran. The amount of dimethylformamide should be at least about one-fifth the amount of chlorobenzene to insure complete solution of the curing agents. Similar results were also obtained with cure temperatures of 225° C. and 250° C. and with benzophenonetetracarboxylic dianhydride and 2,5-dichloroterephthalic acid.

The 80:20 CPS:BCMO polymer cured with trimellitic anhydride and formed into a film with an average caliper of 1.5 mils (0.04 mm) was found to have the following properties:

| | | |
|---|---|---|
| Average Film Caliper: | | 1.5 mils (.038 mm) |
| Tensile Strength at Break | (at 23° C.): | 8.6 – 11.6 × 10³ psi |
| | | (0.60 – 0.81 × 10³ Kg(cm²) |
| | (at 150° C.): | 5.7 – 6.0 × 10³ psi |
| | | (0.40 – 0.42 × 10³ Kg(cm²) |
| Elongation: | (at 23° C.): | 4.0 – 8.0 % |
| | (at 150° C.): | 3.3 – 45 % |
| Tensile Modulus | (at 23° C.): | 340 – 360 × 10³ psi |
| | | (approx. 24 × 10³ Kg/cm²) |
| | (at 150° C.): | 260 – 270 × 10³ psi |
| | | (18 – 19 × 10³ Kg/cm²) |
| Density: | | 1.23 g/cc |
| Coefficient of Thermal Exp. | (range: –4°C. to 50°C.): | 60 × 10⁻⁶/° C. |
| Thermal Aging | at 240° C.: | Samples still maintained 3–4% elongation after 1155 hrs. |
| 180° Flex Test | at 240° C.: | Partial failures in 144 hours Total failures in 240 hours |
| Heat Shrinkage | 200° C.: | None |
| | 250° C.: | 0 – 0.3% |
| | 300° C.: | 0 – 0.7% |
| Flammability: | | 24 – oxygen index |
| Moisture Absorption | at 23° C.: | 0.34 – 0.57 wt. % |
| Dielectric Constant | at 23° C.: | 3.33 – 3.28 (increasing frequency) |
| | at 150° C.: | 3.21 – 3.20 (increasing frequency) |
| Dissipation Factor | at 23° C.: | .0015 – .0083 (increasing frequency) |
| | at 150° C.: | .0008 – .0041 (increasing frequency) |

The solvent resistance of the crosslinked film was determined in (1) chlorinated hydrocarbons ("Aroclor" 1232 and 1254, trademark of Monsanto Chemical Co. for high boiling chlorinated hydrocarbons and "Pyranol," trademark of General Electric Co. for chlorinated aromatic compounds), (2) mineral oil, (3) aqueous media (distilled water, 10 wt. % NaOH, water at pH of 1, and water at pH of 10), (4) toluene, (5) polar organic solvents of varying oxidation state (methanol, acetone, acetic acid), and (6) a phenolic solvent (cresol). No effect upon the film was observed after lengthy soaking in the first three classes of solvents. The film was swollen but not dissolved by solvents (4), (5), and (6).

What is claimed is:

1. An aromatic containing polyether polymer consisting essentially of

I. units of the formula (a) 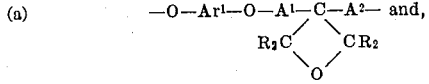 and,

II. 0 – 90 mole percent units of the formula b. $- O - Ar^1 - O - Ar^2 -$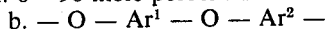

wherein $Ar^1$ is an aromatic nucleus, $Ar^2$ is an aromatic nucleus substituted with an electron withdrawing group capable of activating a halogen substituent in the aromatic nucleus, and $A^1$ and $A^2$ are lower aliphatic radicals, and R is selected from the group consisting of hydrogen and lower alkyl.

2. A polyether polymer according to claim 1 wherein $A^1$ and $A^2$ are methylene radicals.

3. A polymer according to claim 1 wherein said polymer comprises 20 – 85 mole percent of units of said formula (b) and 15 – 80 mole percent of units of said formula (a).

4. A polymer according to claim 3 wherein said polymer comprises 20 – 40 mole percent of units of said formula (a).

5. A polymer according to claim 1 wherein said polymer has been crosslinked with a crosslinking agent capable of reacting with an oxetane ring.

6. A polymer according to claim 5 wherein said crosslinking agent is derived from an aromatic polycarboxylic acid.

7. A polymer according to claim 6 wherein said crosslinking agent derived from an aromatic carboxylic acid is selected from the group consisting of a polyacid chloride, a chloro-substituted dicarboxylic acid, and a polyacid anhydride.

8. A polymer having the formula

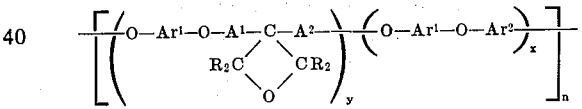

wherein $Ar^1$ is an aromatic nucleus comprising two independent phenyl radicals joined by a bridging radical having the formula $- CR_2 -$, R being selected from the group consisting of hydrogen and lower alkyl, $Ar^2$ is an aromatic nucleus comprising two phenyl radicals joined by a para-substituted electron-withdrawing bridging radical capable of activating a halogen substituent in the aromatic ring, $A^1$ and $A^2$ are lower aliphatic radicals, n is the index of polymerization and is a number selected so as to provide said polymer with an inherent viscosity, determined with a 0.5 weight percent solution in 1,1,2,2-tetrachloroethane, of at least about 0.4, and x and y are selected such that the ratio x:y ranges from 85:15 to 60:40.

9. A polymer according to claim 8 wherein $A^1$ and $A^2$ are methylene radicals.

10. A polymer according to claim 8 wherein at least one of the R groups in each of the $-CR_2-$ radicals is hydrogen.

11. A polymer according to claim 8 wherein $Ar^1$ is the residue of bisphenol A with the phenolic hydrogens removed and A$r^2$ is the residue of p-dichlorodiphenyl sulfone with the chlorine atoms removed.

12. A process for preparing an oxetane-containing polymer comprising the steps of:
 1. interacting a di-alkali metal salt of a dihydric phenol with an oxetane-containing compound of the formula

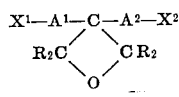

wherein
 A$^1$ and A$^2$ are lower aliphatic radicals,
 X$^1$ and X$^2$ are the same or different and are substituents such as halogen atoms which can be split out to form alkali metal salt, and
 R is selected from the group consisting of hydrogen and lower alkyl, and
 2. reacting the product of step (1) with an aromatic dihalide having a halogen activating, ring-substituted electron-withdrawing group,
wherein said oxetane-containing compound is at least 10 mole percent of the total halide component.

13. A process according to claim 12 wherein A$^1$ and A$^2$ are methylene radicals.

14. A process according to claim 12 wherein the product of said step (2) is subsequently further reacted with additional oxetane-containing compound.

* * * * *